United States Patent
Masuda et al.

(10) Patent No.: US 8,205,924 B2
(45) Date of Patent: Jun. 26, 2012

(54) PICK-UP STYLE UTILITY VEHICLE WITH EXPANDABLE CARGO BED

(75) Inventors: Yoshihiro Masuda, Kobe (JP); Masaki Tanaka, Hirakata (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 268 days.

(21) Appl. No.: 12/647,799

(22) Filed: Dec. 28, 2009

(65) Prior Publication Data

US 2011/0156440 A1 Jun. 30, 2011

(51) Int. Cl.
*B62D 33/00* (2006.01)
(52) U.S. Cl. .............. 296/24.43; 296/183.1; 280/748
(58) Field of Classification Search .............. 296/183.1, 296/182.1, 26.1, 26.11, 24.43; 160/24, 23.1; 280/748

See application file for complete search history.

(56) References Cited

U.S. PATENT DOCUMENTS

| | | | | |
|---|---|---|---|---|
| 3,169,792 | A * | 2/1965 | Solano Viquez | 296/99.1 |
| 4,932,704 | A * | 6/1990 | Ament | 296/37.16 |
| 5,464,052 | A * | 11/1995 | Wieczorek et al. | 160/23.1 |
| 5,551,726 | A * | 9/1996 | Ament | 280/749 |
| 6,905,159 | B1 | 6/2005 | Saito et al. | |
| 6,994,388 | B2 | 2/2006 | Saito et al. | |
| 7,249,798 | B2 | 7/2007 | Saito et al. | |
| 7,318,617 | B1 * | 1/2008 | Scotton | 296/37.16 |
| 7,591,296 | B2 * | 9/2009 | Busha et al. | 160/24 |
| 7,717,156 | B2 * | 5/2010 | Costello et al. | 160/317 |
| 2003/0141731 | A1 * | 7/2003 | Betts et al. | 296/24.1 |
| 2007/0013201 | A1 * | 1/2007 | Wagner et al. | 296/24.43 |
| 2007/0035145 | A1 * | 2/2007 | Walter et al. | 296/24.43 |

\* cited by examiner

*Primary Examiner* — Dennis Pedder
*Assistant Examiner* — Pinel Romain
(74) *Attorney, Agent, or Firm* — Wenderoth, Lind & Ponack, LLP (57) ABSTRACT

A pick-up style utility vehicle has a front seat, a rear seat, a cargo bed that is expandable forward, and a screen shield arranged at the front end of the cargo bed. The position of the cargo bed can be changed between an expanded state and a non-expanded state. A winding device for the screen shield is provided on a front panel. The screen shield is made of a net material having flexibility, for example. One end of the screen shield is windably supported by the winding device. The other end of the screen shield has an engaging portion. A first engaged portion for a non-expanded position and a second engaged portion for an expanded position are provided in the cabin frame.

7 Claims, 13 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle having a front seat, rear seat, and a cargo bed in this order from the front of the vehicle; and a screen shield partitioning the cargo bed and a riding space surrounded by a cabin frame in front of the cargo bed. More particularly, it relates to the pick-up style utility vehicle in which the cargo bed can be expanded in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement on golf courses, golf course maintenance, and the like.

The present applicants have developed other inventions relating to the pick-up style utility vehicle with a cargo bed whose area or capacity can be expanded. Their applications have been filed, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from the front of the vehicle. The rear seat can be changed between a used state and a retracted state to switch between a 2 passengers transformation and a 4 passengers transformation. In the 2 passengers transformation, a front portion of the cargo bed can be expanded into a riding space occupied by the rear seat in the used state.

Typically, a screen shield is provided at the front end of the cargo bed of the pick-up style utility vehicle so as to prevent a load loaded on the cargo bed from moving into the riding space in front of the cargo bed. The position of the screen shield can be changed between the 2 passengers transformation expanding the cargo bed in a front direction, and the 4 passengers transformation not expanding the cargo bed.

Figure 17:
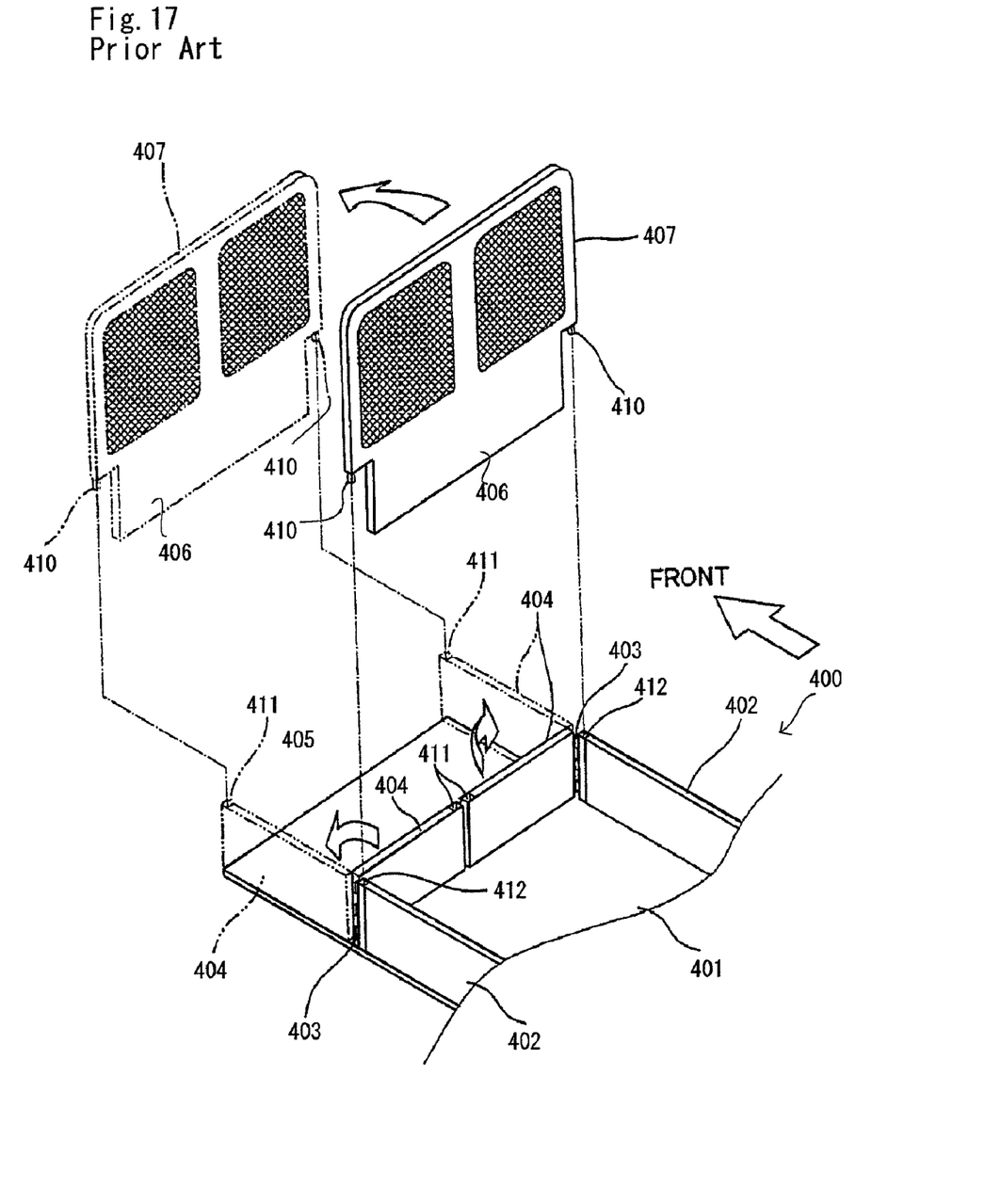
FIG. 17 is a perspective view of the prior art.

FIG. 17 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, an expandable bottom plate 405 provided at the front end of the stationary bottom plate 401, and a front panel 406. A screen shield 407 is integrally formed with the front panel 406.

Pins 410 are provided at the right and left ends of the screen shield 407 for positioning and fixing. The pins 410 protrude in a downward direction. Pin insertion holes 411 and 412, into which each of the pins 410 of the screen shield 407 can be inserted, are formed in the upper surface of the end of each of the expandable side panels 404 and the upper surface of the front end of each of the stationary side panels 402.

As indicated by the solid lines in FIG. 17, when the expandable side panels 404 are closed (4 passengers transformation), the screen shield 407 is located at the front ends of the stationary side panels 402 and the pins 410 of the screen shield 407 are inserted into the pin insertion holes 412 of the stationary side panels 402 from above. As indicated by the imaginary lines, when the expandable side panels 404 are opened in a front direction (2 passengers transformation), the screen shield 407 is located at the front ends of the expandable side panels 404 and the pins 410 of the screen shield 407 are inserted into the pin insertion holes 411 of the expandable side panels 404 from above.

With the above configuration, the screen shield 407 can be moved between an expanded position when the cargo bed 400 is expanded and a non-expanded position when the cargo bed 400 is not expanded. The screen shield 407 must be lifted together with the front panel 406 to pull out the right and left pins 410 from the pin insertion holes 411 or 412. The screen shield 407 and the front panel 406 are then moved together in a rear or front direction. After the movement, the pins 410 are again inserted into the pin insertion holes 412 or 411 from above.

However, the integral front panel 406 and screen shield 407 are made of metal and are heavy. The width of the screen shield 407 extends over substantially the entire left-right width of the cargo bed 400. Therefore, it is very hard for one person to move the screen shield 407 together with the front panel 406. At present, the left and right ends of the screen shield 407 and the front panel 406 need to be held and lifted by two operators to pull out the pins 410, and after this movement, the pins 410 need to again be inserted into the pin insertion holes 411 or 412. The process of moving the screen shield 407 takes a long time.

SUMMARY OF THE INVENTION

The present invention has been made in view of the above problems and an object of the present invention is to provide a pick-up style utility vehicle which can make the weight of a screen shield smaller and easily install or retract the screen shield into a desired position and at a desired inclination angle, if necessary. Another object of the present invention is to facilitate the expanding or contracting operation of a cargo bed and the moving operation of the screen shield with the operation, thereby permitting a single operator to perform the operations easily and immediately.

To achieve the above object, a first aspect of the invention provides a pick-up style utility vehicle having a front seat, a rear seat, and a cargo bed in this order from a front of the vehicle. A screen shield is provided to partition the cargo bed and a riding space surrounded by a cabin frame in front of the cargo bed. A winding device of the screen shield is provided on a vehicle body configuring portion, and the screen shield is made of a net material having flexibility or a sheet material having flexibility and a transparent portion, and one end of the screen shield is windably supported by the winding device.

With the above configuration, the weight of the screen shield can be smaller than that of the prior art screen shield which is made of metal or resin having high rigidity. When necessary, the screen shield can be pulled out and set in a desired position. When not necessary, the screen shield can be retracted. The limited space in the vehicle can be effectively used.

In a second aspect of the invention, the cargo bed is changeable between an expanded state in which the cargo bed is expanded forward so as to occupy at least part of the riding space and a non-expanded state not occupying the riding space. The winding device is provided on the front panel of the cargo bed as the vehicle body configuring portion, the other end of the screen shield has an engaging portion, and a first engaged portion that the engaging portion of the screen shield engages when the cargo bed is in the expanded state and a second engaged portion that the engaging portion of the screen shield engages when the cargo bed is in the non-expanded state are provided in the cabin frame.

With the above configuration, in the expanding or contracting operation of the cargo bed, the screen shield can be changed between an expanded position and a non-expanded position only by changing the engaged position of the engaging portion of the screen shield without being lifted. In other words, the position of the screen shield can be easily changed by one operator. When no loads are loaded in the cargo bed, the screen shield is wound by the winding device to eliminate the screen shield from behind a passenger so that the rear side can be easily seen.

In a third aspect of the invention, the cargo bed is changeable between an expanded state in which the cargo bed is expanded forward so as to occupy at least part of the riding space and a non-expanded state not occupying the riding space. The winding device is provided on the cabin frame as the vehicle body configuring portion, the other end of the screen shield has an engaging portion, and an engaged portion that the engaging portion of the screen shield engages is provided on the front panel of the cargo bed.

With the above configuration, as in the second aspect of the invention, in the expanding or contracting operation of the cargo bed, the screen shield can be changed between an expanded position and a non-expanded position without being lifted. In other words, the position of the screen shield can be easily changed by one operator. When no loads are loaded in the cargo bed, the screen shield is wound by the winding device to eliminate the screen shield from behind a passenger so that the rear side can be easily seen.

In the second and third aspects of the invention, the engaging portion of the screen shield is a bar having a flange, and the first or second engaged portion of the cabin frame or the engaged portion of the front panel is a groove or a hook that the bar can engage. The engaging portion of the screen shield can also be a hook.

With the above configuration, the engaging portion of the screen shield can be easily fixed in a predetermined position without using a fixing member such as a bolt.

In the second aspect of the invention, a third engaged portion that the engaging portion of the screen shield can engage can be provided at the rear end of the cargo bed.

With the above configuration, when loads such as fallen leaves, which can be easily scattered, are loaded into the cargo bed, they are pressed by the screen shield so that they cannot be scattered or moved. In other words, the load can be fixed in a stable state.

In the first aspect of the invention, preferably, a spring urging the screen shield in a winding direction can be provided in the winding device. In addition, a housing box housing the wound screen shield can be provided in the winding device.

As described above, the spring for winding the screen shield is provided in the winding device. Therefore, when the screen shield is used, the slacking of the screen shield can be prevented. In addition, the screen shield can be automatically wound, thereby facilitating the winding operation.

In the third aspect of the invention, the winding device can house the screen shield in a cross member of the cabin frame.

With the above configuration, a member for housing the screen shield need not be additionally provided. The number of components can be reduced. The appearance of the vehicle can be improved.

In the third aspect of the invention, the winding device can be provided on the cabin frame so as to be slidable in a forward direction and a rearward direction.

With the above configuration, the screen shield can be installed in a desired position in a front-rear direction at a desired inclination angle.

DETAILED DESCRIPTION OF THE PREFERRED EMBODIMENTS

First Embodiment of the Present Invention

Figure 1:
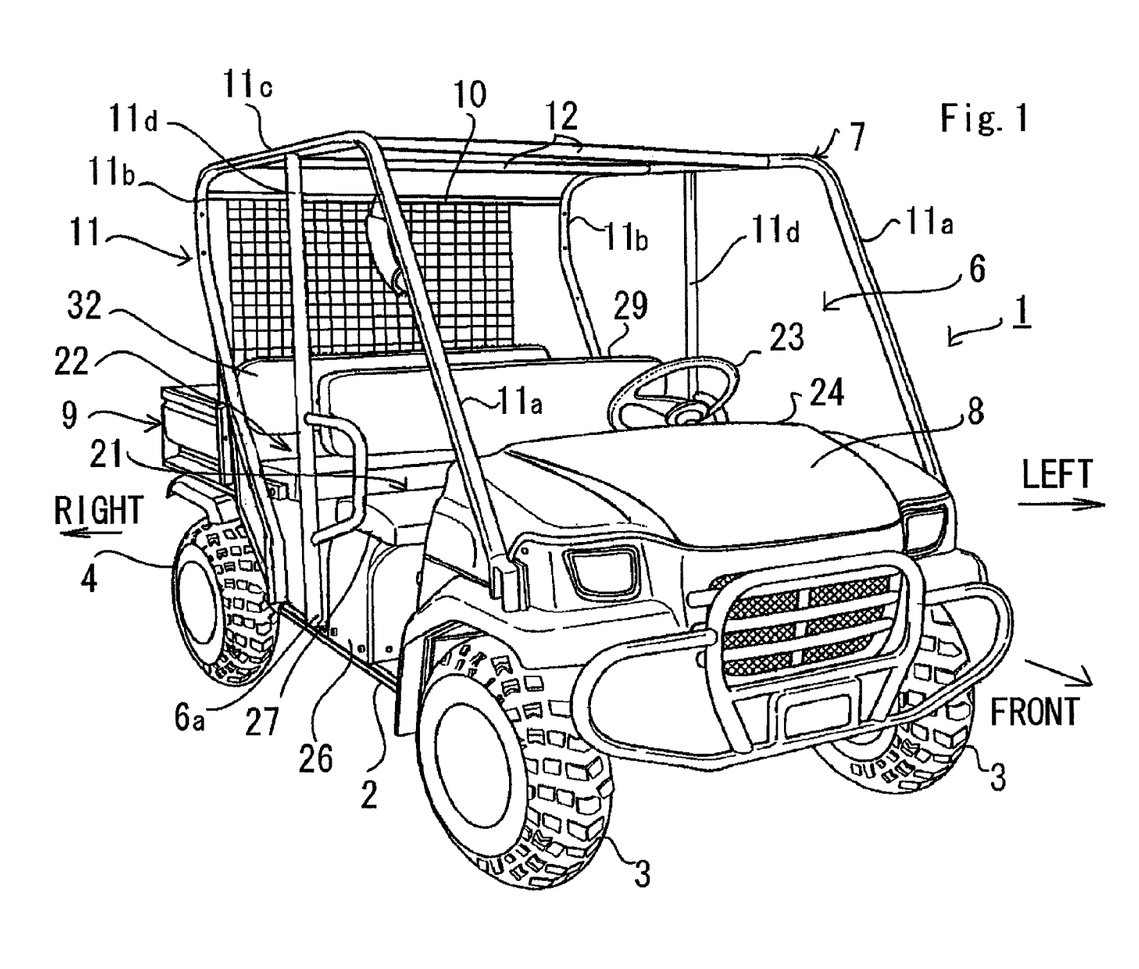
FIG. 1 is a perspective view of a pick-up style utility vehicle according to a first embodiment of the present invention.
Figure 2:
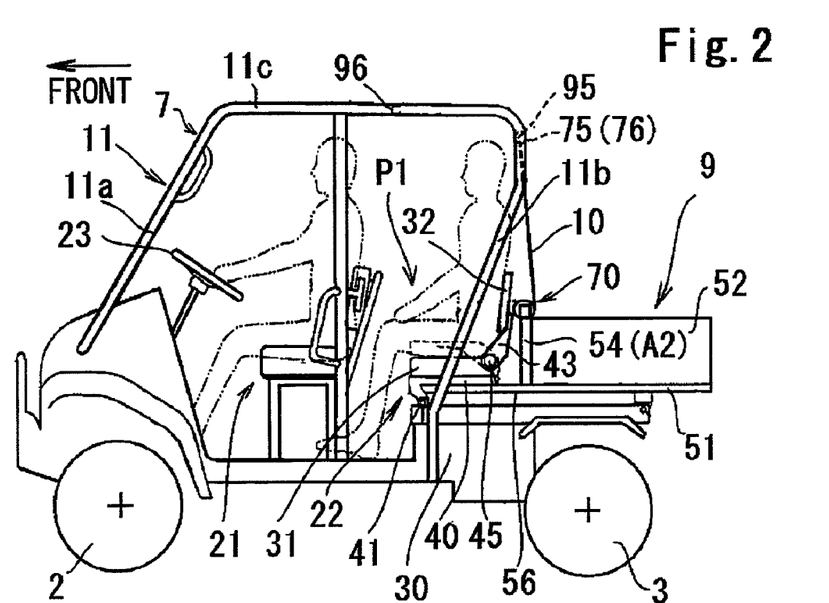
FIG. 2 is a left side view of FIG. 1 when a cargo bed is not expanded.
Figure 3:
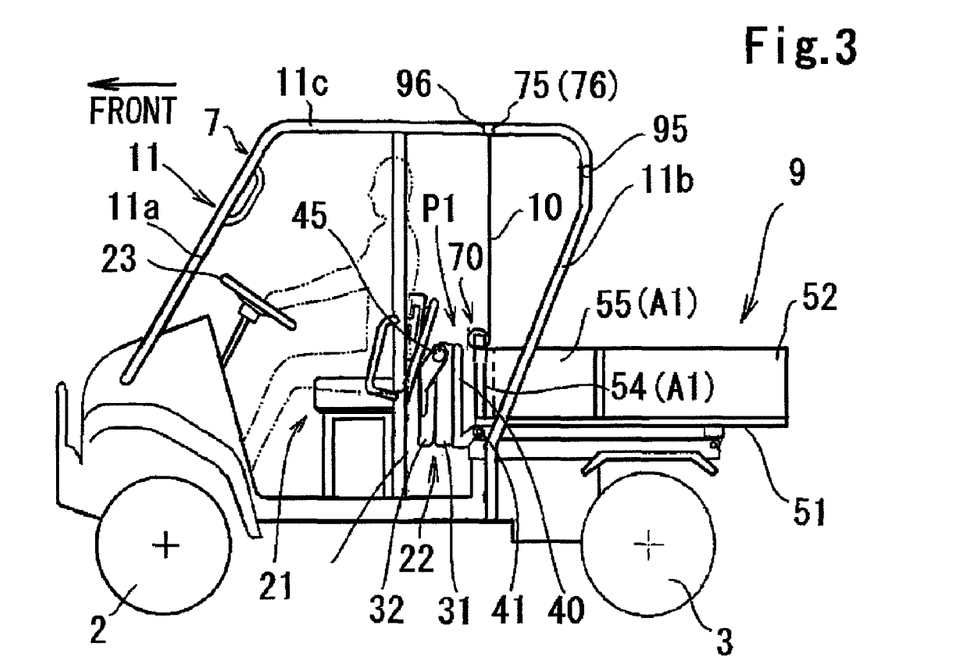
FIG. 3 is a left side view of FIG. 1 when the cargo bed is expanded.

FIGS. 1 to 12 show a pick-up style utility vehicle with an expandable cargo bed according to a first embodiment of the present invention, which is changeable between a 4 passengers transformation contracting a cargo bed 9, as shown in FIG. 2, and a 2 passengers transformation folding a rear seat 22 and expanding the cargo bed 9 forward, as shown in FIG. 3.

FIG. 1 is a perspective view of the pick-up style utility vehicle. For convenience of the description, the right and left as seen from a passenger riding in the vehicle will be described as the right and left of the vehicle. A pick-up style utility vehicle 1 has a vehicle body 2 supported by a pair of left and right front wheels 3 and a pair of left and right rear wheels 4. A cabin frame 7 configuring a cabin 6 is provided in an intermediate portion on the vehicle body 2 in a front-rear direction. A hood (bonnet) 8 is provided in front of the cabin frame 7. The cargo bed 9 is provided behind the cabin frame 7. A screen shield 10 partitioning the cargo bed 9 and a riding space is provided at the front end of the cargo bed 9 so as to be position changeable forward and rearward.

The cabin frame 7 surrounding the cabin 6 has a pair of left and right side frame members 11 formed in a U-shape and made of metal pipes, and cross frame members 12 made of a plurality of metal pipes coupling the side frame members 11. Each of the side frame members 11 has a front side portion 11a extended rearward and upward from near the left or right side portion of the hood 8, a rear side portion 11b extended substantially upward from the left or right side portion at the rear end of the cabin 6, an upper side portion 11c integrally coupling the upper end of the front side portion 11a and the upper end of the rear side portion 11b and extended forward and rearward, and an intermediate vertical portion 11d coupling the intermediate portion of the upper side portion 11c in a front-rear direction and a floor surface 6a.

A bench-shaped front seat 21 is installed in the front half portion of the cabin 6. The bench-shaped rear seat 22 of a foldable type is installed in the rear half portion of the cabin 6. A dashboard (operating portion) 24 having a steering wheel 23 and the like is provided at the front end of the cabin 6.

FIG. 2 is a left side view of the pick-up style utility vehicle in the 4 passengers transformation. The bench-shaped front seat 21 has a seat leg 26 erected on the floor surface 6a of the cabin 6, a seat bottom 27 provided on the upper end face of the seat leg 26, and a backrest 29 fixed via a supporting stay, for example, to the intermediate vertical portion 11d. The bench-shaped front seat 21 is typically extended leftward and rightward to near the left and right ends of the cabin 6. With this configuration, two persons can be seated side by side. A driver is seated on the left area of the front seat 21 and a passenger is seated on the other area. The bench-shaped rear seat 22 has a seat bottom 31 arranged on the upper side of a box 30 housing an engine (not shown), and a backrest 32. As in the front seat 21, the seat bottom 31 and the backrest 32 are extended leftward and rightward to near the left and right ends of the cabin 6. With this configuration, two passengers can be seated side by side.

In FIG. 2, the folded configuration of the rear seat 22 will be described in detail. The seat bottom 31 is fixed onto the upper surface of a supporting base 40. The front end of the supporting base 40 is rotatably supported at the front upper end of the box 30 via a hinge 41. A pair of left and right stays 43 extended downward are fixed to the backrest 32. The lower end of each of the stays 43 is rotatably coupled to the rear end of the seat bottom 31 via a hinge 45.

FIG. 3 shows the state in which the rear seat 22 is folded. The backrest 32 is rotated about the hinge 45 so as to be brought into contact with the upper surface of the seat bottom 31. The seat bottom 31 is rotated about the hinge 41 so as to be in a substantially vertical state together with the backrest 32. The rear seat 22 is folded in the retracted state of FIG. 3. In this manner, the rear seat 22 is folded and retracted so that a rear riding space P1 can be used as the forward expanded space of the cargo bed 9.

Figure 4:
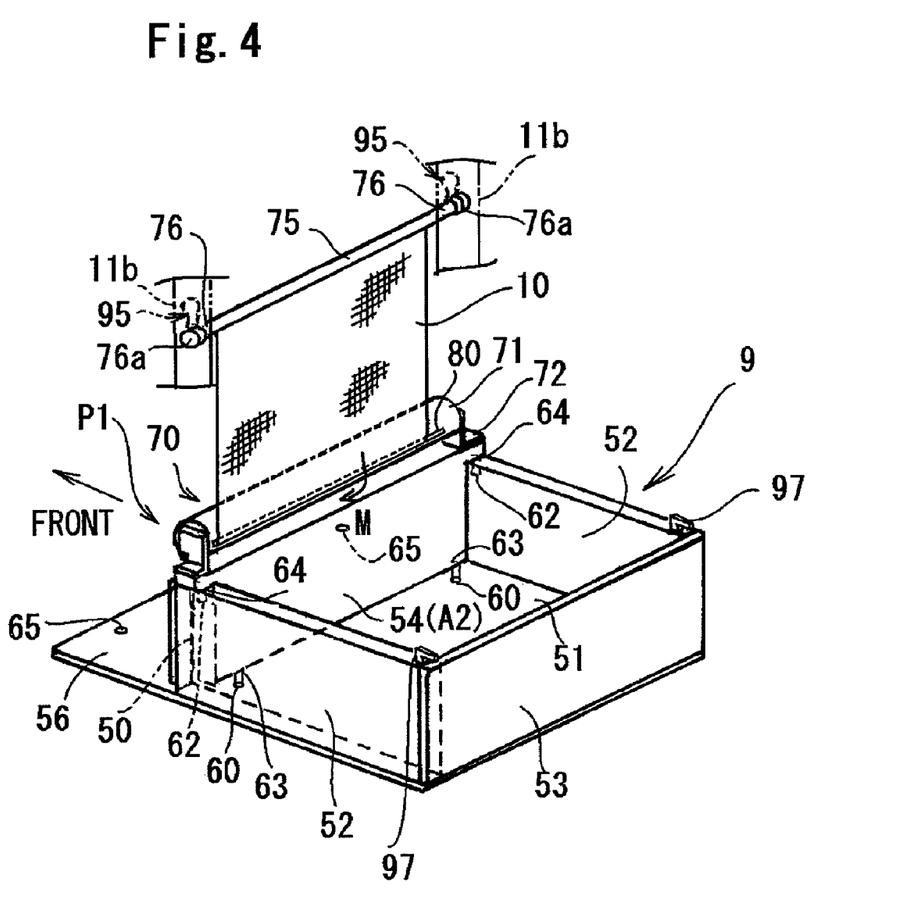
FIG. 4 is a perspective view of the non-expanded cargo bed and the screen shield of FIG. 1.
Figure 5:
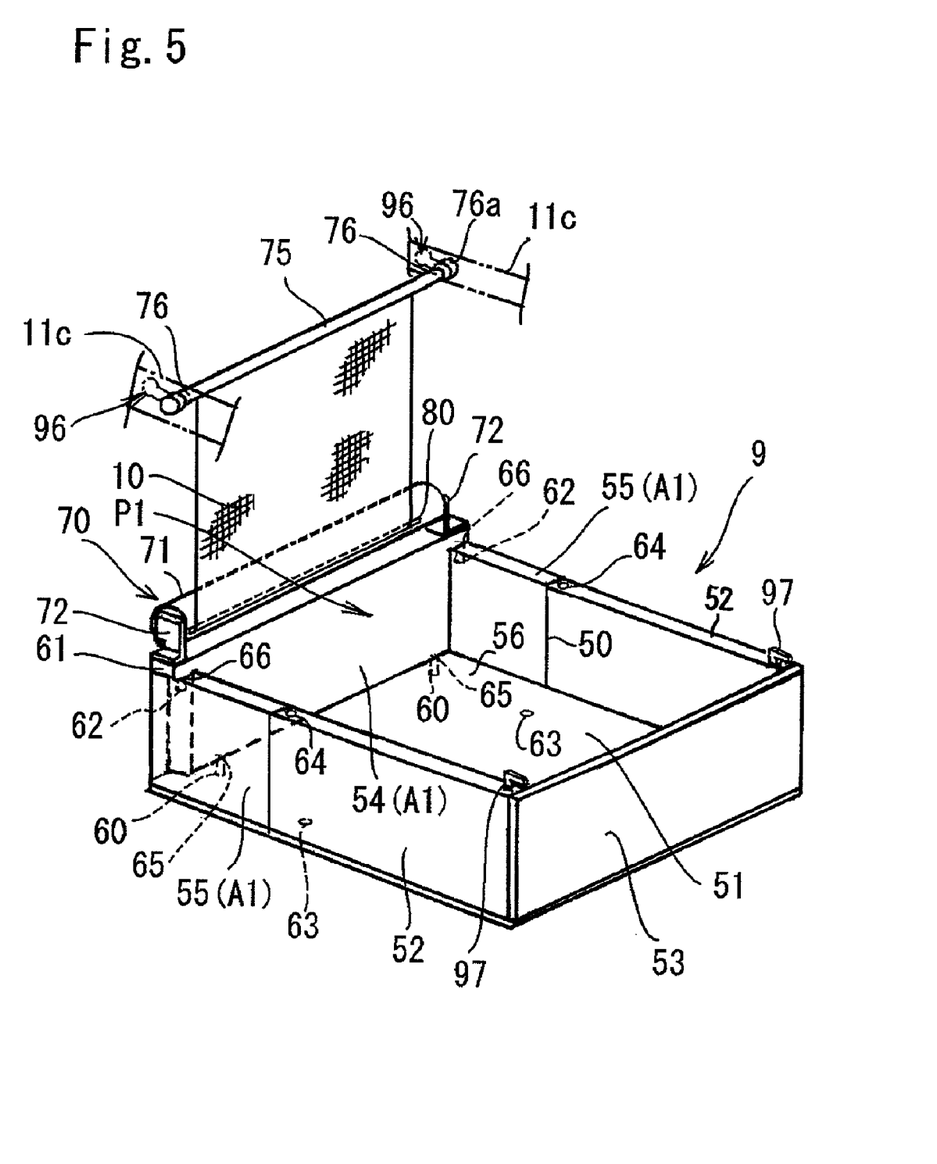
FIG. 5 is a perspective view of the expanded cargo bed and the screen shield of FIG. 1.

FIG. 5 is a perspective view of the expanded cargo bed 9 and the screen shield 10. The cargo bed 9 has, as a basic configuration, a stationary bottom plate 51, a pair of stationary side panels 52 provided substantially perpendicular to the stationary bottom plate 51 along the left and right ends of the stationary bottom plate 51, an openable and closeable gate type rear panel 53 provided at the rear end of the stationary bottom plate 51, and a front panel 54. In addition to these components, in order to expand the cargo bed 9 forward, the cargo bed 9 has a pair of left and right expandable side panels 55, and an expandable bottom plate 56 extended forward from the front end of the stationary bottom plate 51. The position of the front panel 54 can be changed between an expanded position A1 shown in FIG. 5 and a non-expanded position A2 shown in FIG. 4.

The expandable bottom plate 56 is integral with the stationary bottom plate 51 and is extended forward from the front end of the stationary bottom plate 51 on the same plane as the stationary bottom plate 51 into the rear riding space P1. In the embodiment, each of the expandable side panels 55 is rotatably supported by a vertical hinge 50 provided at the front end of each of the stationary side panels 52 and is changeable between the expanded position A1 in which the expandable side panel 55 is extended forward from the front end of the stationary side panel 52 (see FIG. 5) and the non-expanded position A2 in which the expandable side panel 55 is extended inward in a vehicle width direction from the front end of the stationary side panel 52 (see FIG. 4).

Downwardly protruding lock pins 60 are provided at the left and right ends of the lower end face of the front panel 54. Ear portions 61 protruded outward in a vehicle width direction are provided at the upper left and right ends of the front panel 54. Lock pins 62 protruded downward are provided on the ear portions 61. Pin holes 63 and 64, into which the lock pins 60 and 62 of the front panel 54 in the non-expanded position are inserted, are formed in the front end of the stationary bottom plate 51 and the upper surface of the front end of each of the stationary side panels 52, respectively. Pin holes 65 and 66, into which the lock pins 60 and 62 of the front panel 54 in the expanded position are inserted, are formed in the front end of the expandable bottom plate 56 and the upper surface of the front end of each of the expandable side panels 55, respectively.

The screen shield 10 is made of a resin net having flexibility and is configured in a lattice by a tape-like horizontal member extended in a vehicle width direction and a tape-like vertical member extended in a direction orthogonal to the horizontal member. A scene on the opposite side can be seen through the screen shield. One end of the screen shield 10 is windably supported by a winding device 70. An end bar 75 of circular cross section is provided at the other end of the screen shield 10. The end bar 75 is used to pull the screen shield 10 out and fix the screen shield 10. Both ends of the end bar 75 in a length direction become engaging portions 76 for fixing the screen shield. A flange 76a having a large diameter is formed on each of the engaging portions 76 for preventing the screen shield from falling.

The winding device 70 for winding the screen shield 10 has a cylindrical housing case 71. The housing case 71 is attached to the upper end face of the front panel 54 by a pair of brackets 72 arranged so as to be spaced in a vehicle width direction.

Figure 7:
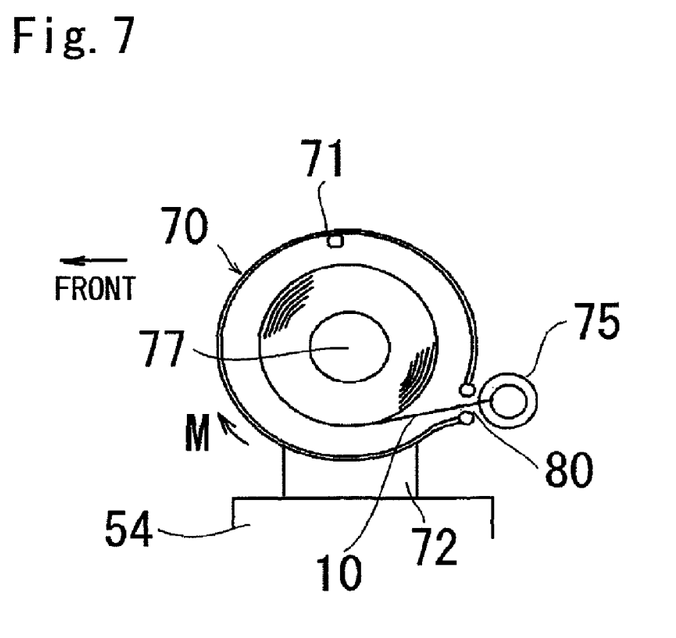
FIG. 7 is a longitudinal sectional view of the center portion of a winding device of the screen shield of FIG. 1 in a width direction.
Figure 8:
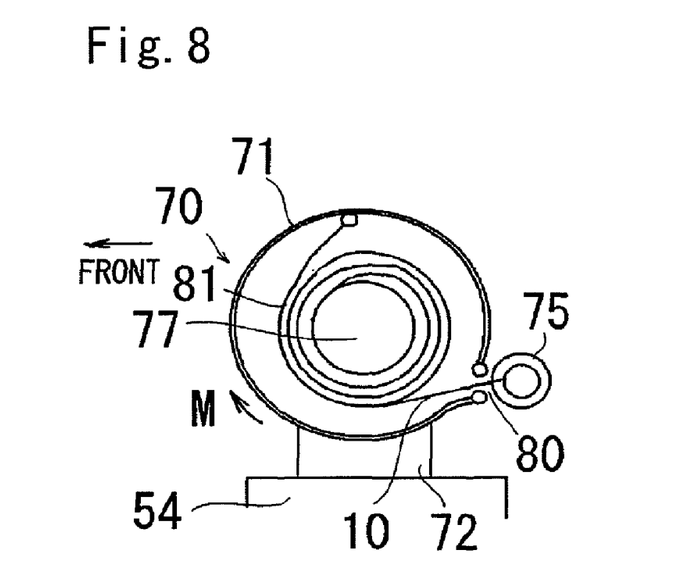
FIG. 8 is a longitudinal sectional view of the end of the winding device of the screen shield of FIG. 1 in a width direction.

FIG. 7 is a longitudinal sectional view of the center portion of the winding device 70 in a vehicle width direction. FIG. 8 is a longitudinal sectional view of the end of the winding device 70 in a vehicle width direction. In FIG. 7, a winding shaft 77 is rotatably supported in the housing case 71. The other end of the screen shield 10 is coupled to the winding shaft 77 to wind the screen shield 10 in an arrow M direction. A screen shield exit 80 formed in the housing case 71 is formed at the rear lower end of the housing case 71.

Figure 6:
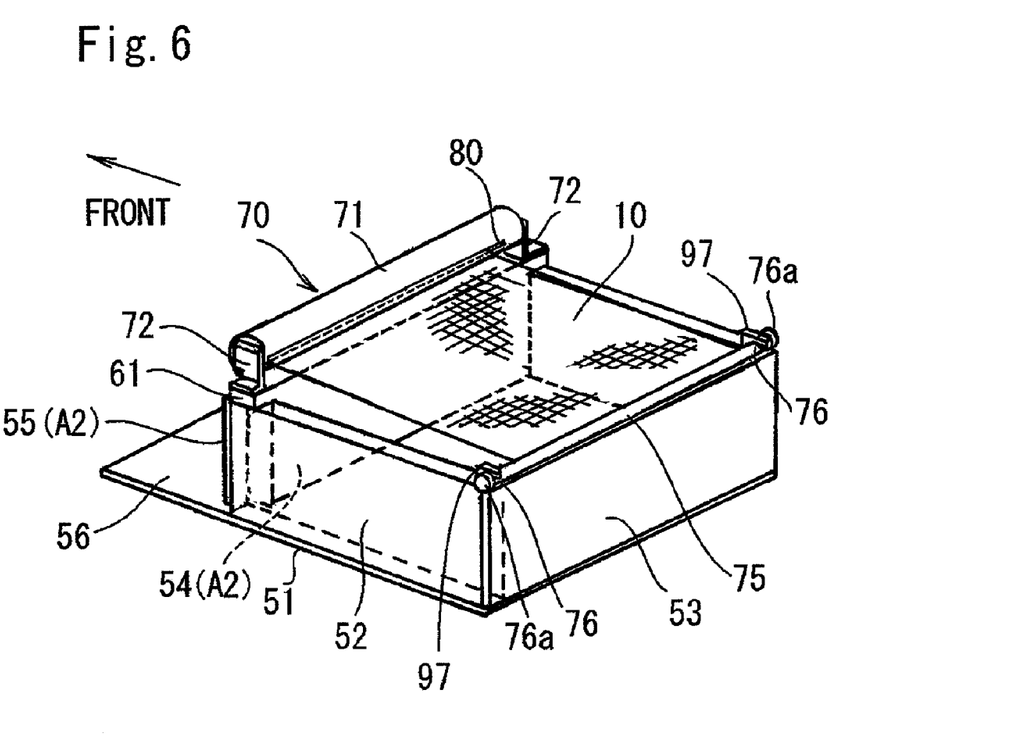
FIG. 6 is a perspective view of the non-expanded cargo bed of FIG. 1 and the screen shield in another use state.

In FIG. 8, to urge the winding shaft 77 in the winding direction M, a spiral spring 81 is arranged in the housing case 71. One end of the spiral spring 81 is coupled to the winding shaft 77. The other end of the spiral spring 81 engages the inner surface of the housing case 71. As shown in FIG. 6, when the screen shield 10 covers the upper surface of the cargo bed 9 from above, a gap between the screen shield 10 and the upper surface of the cargo bed 9 is reduced to prevent a load in the cargo bed 9 from being dropped. In this aspect, it is preferable.

In FIG. 2, a first engaged portion 95 and a second engaged portion 96, which can engage the engaging portion 76 of the end bar 75 of the screen shield 10, are provided in the rear side portion 11b and the upper side portion 11c of each of the side frame members 11 of the cabin frame 7. The first engaged portion 95 and the second engaged portion 96 are grooves, and therefore, the first engaged portion 95 and the second engaged portion 96 are hereinafter referred to as a "first engaged groove 95" and a "second engaged groove 96". As shown in FIG. 2, the engaging portion 76 of the end bar 75 of the screen shield 10 in the non-expanded position A2 engages the first engaged groove 95 of the rear side portion 11b. As shown in FIG. 3, the engaging portion 76 of the end bar 75 of the screen shield 10 in the expanded position A1 engages the second engaged groove 96 of the upper side portion 11c.

Figure 9:
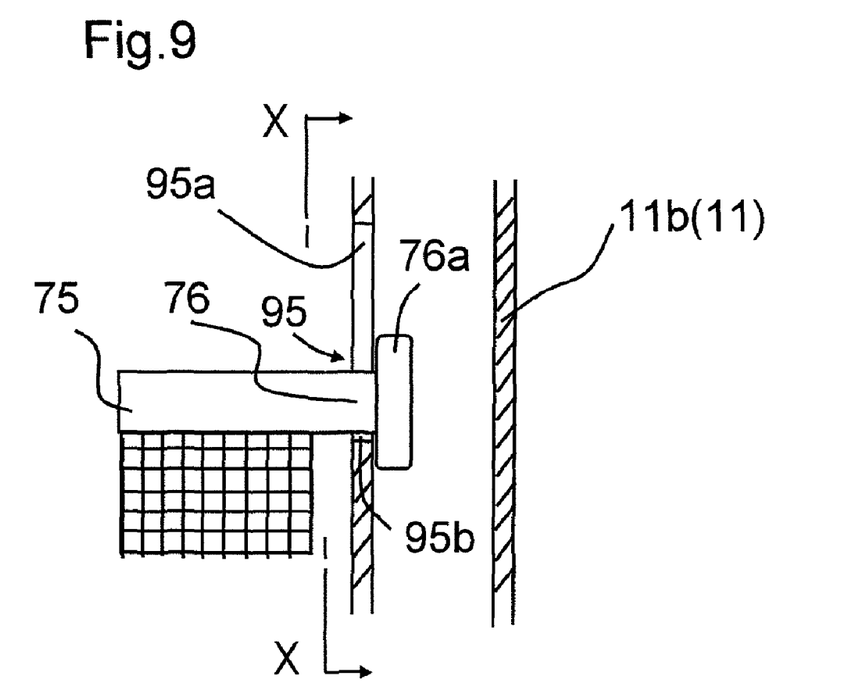
FIG. 9 is a longitudinal sectional view showing the engaged state of an engaging portion of the screen shield and a first engaged portion.
Figure 10:
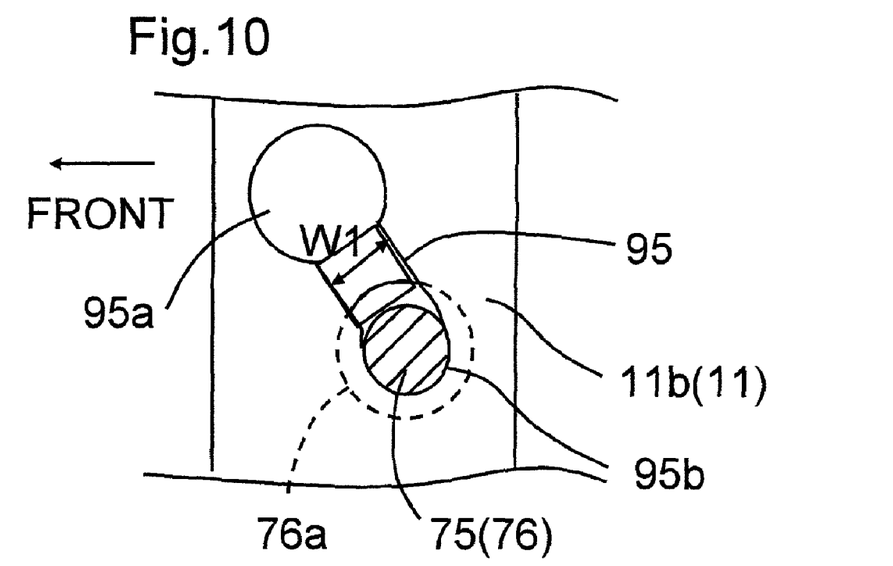
FIG. 10 is a cross-sectional view taken along line X-X of FIG. 9.

FIG. 9 is a longitudinal sectional view showing the engaged state of the first engaged groove 95 and the engaging portion 76 of the end bar 75. FIG. 10 is a cross-sectional view taken along line X-X of FIG. 9. In FIG. 10, a groove width W1 of the first engaged groove 95 is formed so as to be larger than the diameter of the end bar 75 and smaller than the diameter of the flange 76a. An enlarged portion 95a through which the flange 76a can pass is formed at the upper end of the first engaged groove 95. The first engaged groove 95 is tilted forward. A pocket portion 95b bent downward is formed at the lower end of the first engaged groove 95. The engaging portion 76 of the end bar 75 is finally fitted into the pocket portion 95b.

In FIG. 9, the flange 76a of the end bar 75 is fitted from the enlarged portion 95a at the upper end of the first engaged groove 95 into the rear side portion 11b. Thereafter, the end bar 75 is moved downward to engage the pocket portion 95b.

Figure 11:
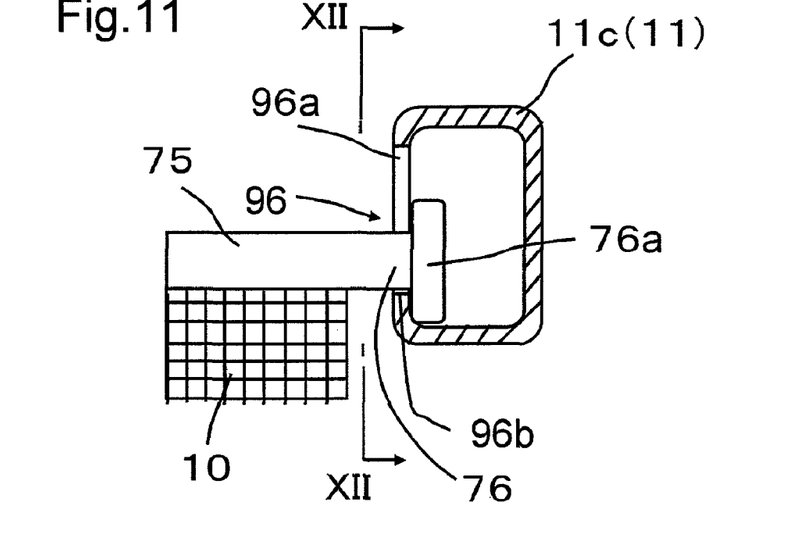
FIG. 11 is a longitudinal sectional view showing the engaged state of the engaging portion of the screen shield and a second engaged portion.
Figure 12:
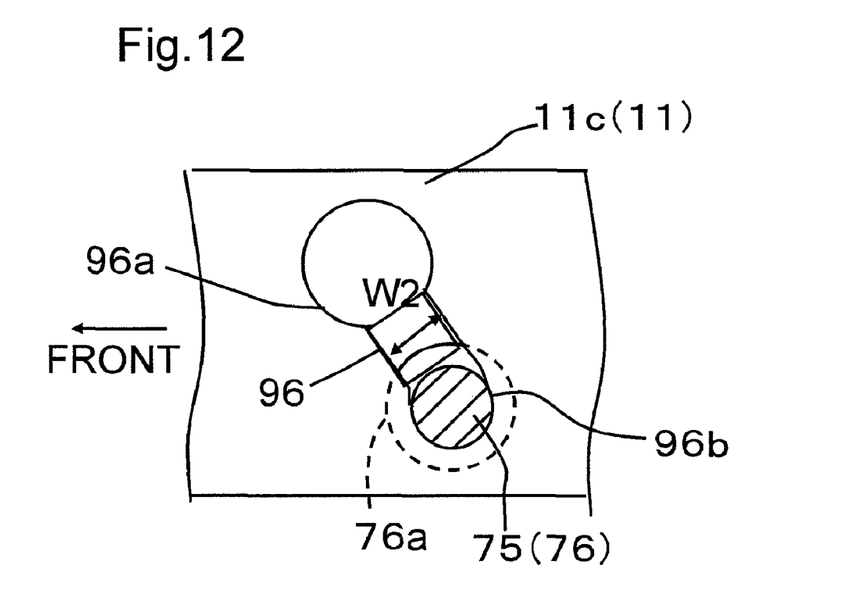
FIG. 12 is a cross-sectional view taken along line XII-XII of FIG. 11.

FIG. 11 is a longitudinal sectional view showing the engaged state of the second engaged groove 96 and the engaging portion 76 of the end bar 75. FIG. 12 is a cross-sectional view taken along line XII-XII of FIG. 11. In FIG. 12, the second engaged groove 96 has the same shape as that of the first engaged groove 95. The second engaged groove 96 has at its upper end an enlarged portion 96a through which the flange 76a can pass. The intermediate portion of the second engaged groove 96 is tilted forward. A pocket portion 96b bent downward is formed at the lower end of the second engaged groove 96. The first and second engaged grooves 95 and 96 are provided as described above so that the screen shield 10 can be attached to the cabin frame 7 with a simple configuration without using fixing means such as a bolt and a nut and can be firmly fixed by the pocket portion 96b.

As shown in FIG. 6, in the first embodiment, in addition to the first engaged groove 95 (FIG. 2) and the second engaged groove 96 (FIG. 3), each of hook-shaped third engaged portions 97 that the engaging portion 76 of the end bar 75 can engage is provided at the rear end of the cargo bed 9, e.g., the rear end of the stationary side panel 52. The engaging portion 76 of the end bar 75 engages the third engaged portion 97, so that the screen shield 10 can be held to cover the upper surface of the cargo bed 9 from above.

The expanding or contracting operation of the cargo bed 9 and the moving operation of the screen shield 10 will be described.

(1) In the 4 passengers transformation shown in FIG. 2, when the cargo bed 9 is not expanded, as shown in FIG. 4, the front panel 54 is located in the non-expanded position A2 corresponding to the front end of the stationary side panel 52, and each of the expandable side panels 55 is located in the non-expanded position A2 in which it is brought into contact with or close to the front surface of the front panel 54. The screen shield 10 is pulled out in an upward direction from the screen shield exit 80 of the winding device 70. The engaging portion 76 at either end of the end bar 75 engages the first engaged groove 95 of each of the rear side portions 11b. In the state that the screen shield 10 is extended, the restoring force of the spiral spring 81 of FIG. 8 acts in the winding direction M. Therefore, the screen shield cannot be slacked and wrinkled during running. Moreover, the flange 76a is inserted into the rear side portion 11b and the engaging portion 76 is fitted into the pocket portion 95b at the lower end of the first engaged groove 95. Therefore, the end bar 75 cannot be disengaged from the first engaged groove 95 due to vibration, wind, or load collision during running.

(2) In the 2 passengers transformation, when the cargo bed 9 is expanded, as shown in FIG. 3, the rear seat 22 is folded and retracted to eliminate the rear riding space P1.

(3) The engaging portion 76 of the screen shield 10 is disengaged from the first engaged groove 95 so that the screen shield 10 is wound by the winding device 70. The screen shield 10 is automatically wound by the spiral spring 81 of FIG. 8.

(4) Both the expandable side panels 55 are rotated about the hinges 50 from the non-expanded position A2 shown in FIG. 4 to the expanded position A1 shown in FIG. 5.

(5) The position of the front panel 54 is changed in a forward direction to the expanded position A1 together with the winding device 70. The screen shield 10 is wound by the winding device 70. The screen shield 10 is formed of a resin net so that the front panel 54 can be easily moved from the non-expanded position A2 to the expanded position A1 by a small operational force of one operator.

(6) In FIG. 5, after the front panel 54 is moved forward to the expanded position A1, the end bar 75 is held to pull out the screen shield 10 in an upward direction from the housing case 71 and is then engaged with each of the second engaged grooves 96. In the state that the screen shield 10 is extended, the restoring force of the spiral spring 81 of FIG. 8 acts in the winding direction M. Therefore, the screen shield cannot be slacked and wrinkled during running. Moreover, the flange 76a is inserted into the second engaged groove 96 of the upper side portion 11c and the engaging portion 76 is fitted into the pocket portion 96b at the lower end of the second engaging groove 96. Therefore, the end bar 75 cannot be disengaged from the second engaged groove 96 due to vibration, wind, or load collision during running.

(7) When the 2 passengers transformation is changed to the 4 passengers transformation and the cargo bed 9 is contracted into the non-expanded state, the expanding operation may be reversed.

(8) When fallen leaves and the like scattered by wind are loaded as a load, as shown in FIG. 6, the screen shield 10 is extended rearward from the housing case 71, to cover or press the upper side of the load so that the engaging portion 76 at either end of the end bar 75 engages each of the hook-shaped third engaged portions 97. The load is covered by the net-like screen shield 10 to prevent the fallen leaves and the like from being scattered during running.

(9) In running without loading any loads, the screen shield 10 can be wound by the winding device 70 in both the 2 passengers transformation and the 4 passengers transformation. Accordingly, the rear side can be easily seen.

Second Embodiment

Figure 13:
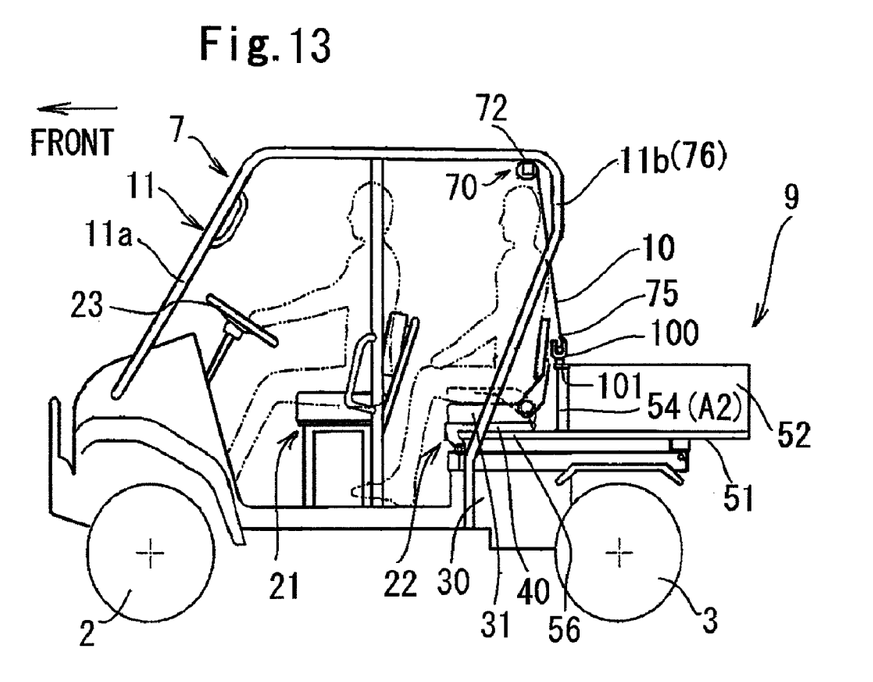
FIG. 13 is a left side view of the pick-up style utility vehicle according to a second embodiment of the present invention in which the cargo bed is in the non-expanded state.
Figure 14:
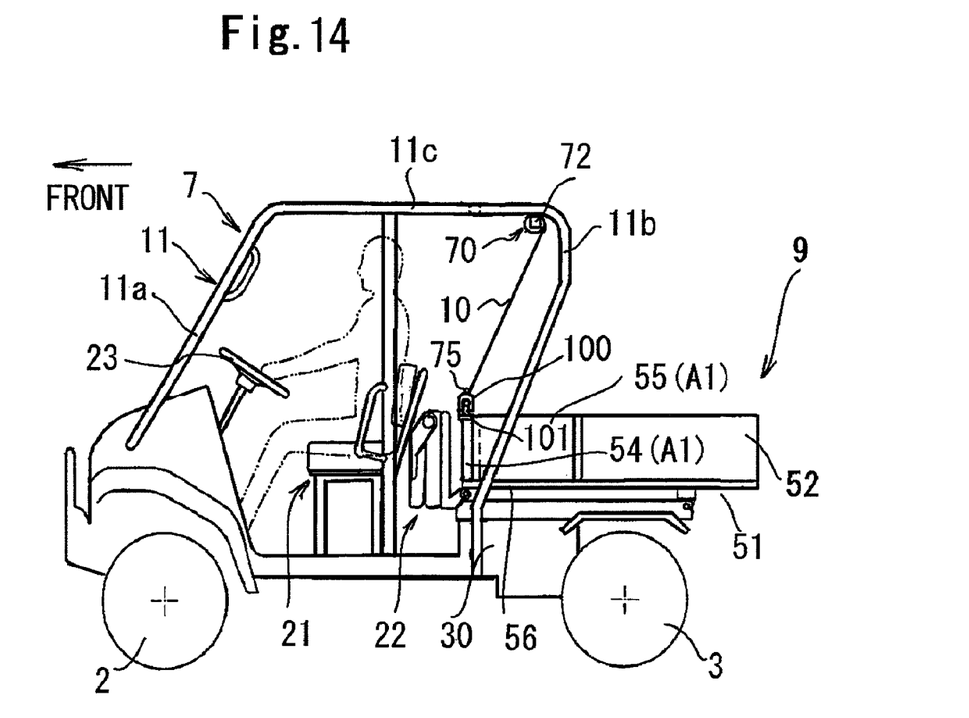
FIG. 14 is a perspective view of the same pick-up style utility vehicle as FIG. 13 when the cargo bed is expanded.
Figure 15:
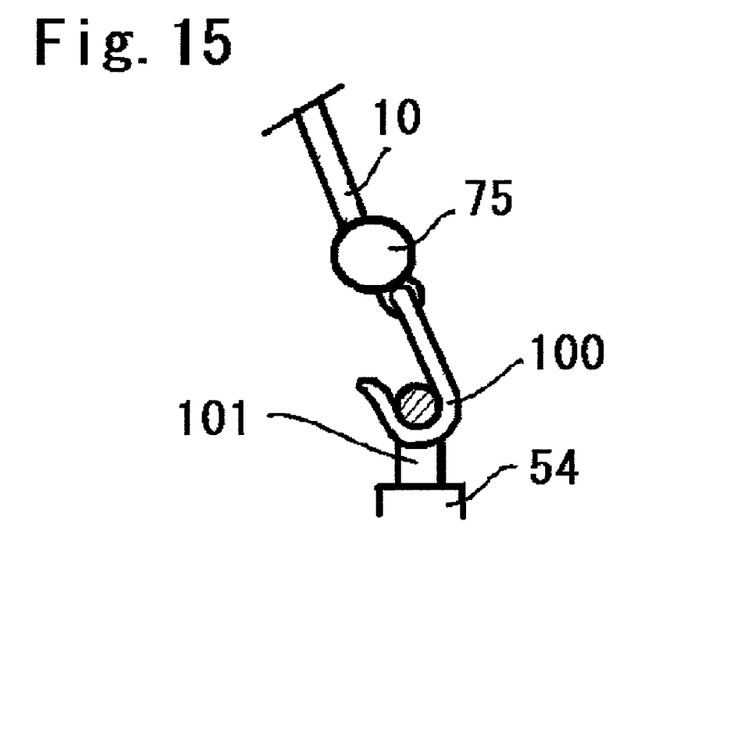
FIG. 15 is a longitudinal sectional view showing the engaged state of an engaging portion of the screen shield and a first engaged portion of FIG. 13.
Figure 16:
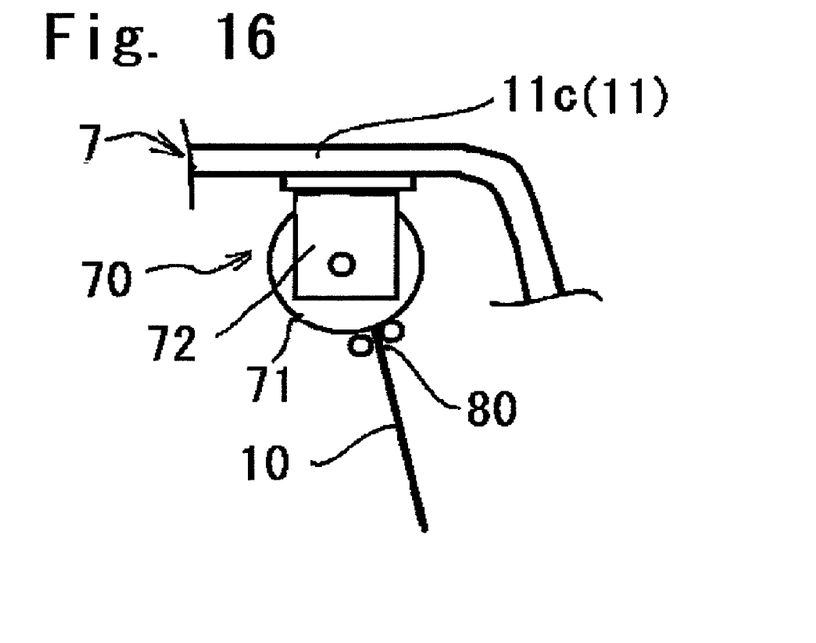
FIG. 16 is an enlarged side view of the winding device of the screen shield of FIG. 13.

FIGS. 13 to 16 show a second embodiment of the present invention. FIG. 13 is a left side view of the pick-up style utility vehicle in the 4 passengers transformation when the cargo bed 9 is not expanded. FIG. 14 is a left side view of the pick-up style utility vehicle in the 2 passengers transformation when the cargo bed 9 is expanded. FIG. 15 is an enlarged view showing the engaged state of an engaging portion and an engaged portion. FIG. 16 is an enlarged side view of the winding device.

The second embodiment has the same configuration as that of the first embodiment except for the following configuration (a) of the winding device and the following configuration (b) of the engaging portion and the engaged portion. Like components are indicated by like reference numerals.

(a) In FIG. 13, the winding device 70 is provided via the bracket 72 at the rear end of the upper side portion 11c of the side frame member 11 of the cabin frame 7. As shown in FIG. 16, the screen shield exit 80 of the winding device 70 is opened at the substantially lower end of the housing case 71.

(b) As shown in FIG. 15, a hook 100 is provided as an engaging portion of the screen shield 10, at either end of the end bar 75 in a left-right direction. A ring 101, a rod, a hook or the like is provided as an engaged portion engaging the hook 100 at the upper end of the front panel 54 of the cargo bed 9.

The expanding or contracting operation of the cargo bed 9 is substantially the same as in the first embodiment. In the moving operation of the screen shield 10, the same ring (engaged portion) 101 provided on the front panel 54 is used when the cargo bed 9 is expanded and is not expanded.

In FIG. 13, when the cargo bed 9 is not expanded, the front panel 54 is located in the non-expanded position A2 corresponding to the front end of the stationary side panel 52 and the screen shield 10 is pulled out substantially immediately below the winding device 70 to engage the ring 101 of the front panel 54.

When the cargo bed 9 is changed into the expanded state after the rear seat 22 is folded and retracted, the hook 100 of the screen shield 10 is unhooked from the ring 101 of the front panel 54 and is wound by the winding device 70. Each of the expandable side panels 55 is opened to the expanded position A1 to move the front panel 54 to the expanded position A1 shown in FIG. 14. In the moving process of the front panel 54, only the front panel 54 is moved, so that the front panel 54 can be easily moved by one operator.

After the front panel 54 is moved to the expanded position A1, the screen shield 10 is pulled out of the winding device 70 so as to be extended downward and the hook 100 engages the ring 101 of the front panel 54.

In the second embodiment, in the expanding or contracting operation of the cargo bed 9, the moving operation of the front panel 54 and the pulling-out, winding, or engaging operation of the screen shield 10 may be performed separately and can be easily performed by a small force of one operator.

In the second embodiment, as shown in FIG. 13, the winding device 70 is arranged substantially immediately above the front panel 54 in the non-expanded position. The winding device 70 can also be arranged forward from the position shown in FIG. 13. The winding device 70 can be arranged in the center portion between the non-expanded position A2 and the expanded position A1 of the front panel 54 in a front-rear direction. In this case, the screen shield 10 is tilted forward and rearward at the same angle in the 4 passengers transformation and 2 passengers transformation.

The winding device 70 can also be arranged immediately above the expanded position A1 of the front panel 54. In this case, the screen shield 10 is extended substantially vertically in the 2 passengers transformation.

The winding device 70 can be shifted forward and rearward on the upper side portion 11c of the side frame member 11. For example, the winding device 70 may be of a detachable type and be detachably fixed in two positions when the cargo bed is expanded and is not expanded.

Alternatively, the winding device 70 may be supported by the upper side portion 11c of the side frame member 11 so as to be slidably movable forward and rearward. When the winding device 70 is slidably moved, fixing means for fixing the winding device 70 in an appropriate position is provided.

Other Embodiments (1) In the above embodiments, the front panel is moved by pulling the lock pin out of the pin hole. The present invention is not limited to the configuration of such a front panel. For example, the front panel can be supported on the expandable side panel or the expandable bottom plate in the expanded position so as to be slid forward and rearward, thereby being changeable in position between the expanded position and the non-expanded position.

(2) In the above embodiments, the expandable side panel of the cargo bed is rotated between the expanded position and the non-expanded position with the hinge as a rotational axis. The present invention is not limited to the configuration of such an expandable side panel and, for example, is applicable to the cargo bed which can slide the expandable side panel forward and rearward.

(3) In the second embodiment, the housing case 71 of the winding device 70 is formed so as to be separated from the cabin frame 7. The cross frame member 12 is cylindrically formed so that the cylindrical frame cross member 12 can be used as the housing case of the screen shield 10. In other words, the wound screen shield 10 is housed in the cross member 12 of the cabin frame, so that the appearance can be improved.

(4) As the material of the screen shield 10, in addition to the resin net material, a transparent sheet such as nylon or a sheet having partly a transparent portion can be used.

The present invention is not limited to the configurations of the above embodiments and includes various modified examples contemplated in the scope of the invention without departing from the scope of the appended claims.

What is claimed is:
1. A pick-up style utility vehicle comprising:
a front seat;
a rear seat; and
a cargo bed in this order from a front of the vehicle,
the pick-up style utility vehicle further comprising:
a cabin frame surrounding a riding space in front of the cargo bed;
a screen shield partitioning the cargo bed and the riding space; and
a winding device for the screen shield, the winding device being attached to the cabin frame, wherein:
the screen shield is made of a flexible material, and a first end of the screen shield is windably supported by the winding device;
the cargo bed is changeable between an expanded state in which the cargo bed is expanded forward so as to occupy at least part of the riding space and a non-expanded state not occupying the riding space;

a second end of the screen shield has an engaging portion; and a front panel of the cargo bed includes an engaged portion, and the engaging portion of the screen shield is engageable with the engaged portion on the front panel of the cargo bed.

2. The pick-up style utility vehicle according to claim 1, wherein the winding device houses the screen shield in a cross member of the cabin frame.

3. The pick-up style utility vehicle according to claim 1, wherein the winding device is attached to the cabin frame so as to be slidable forward and rearward.

4. The pick-up style utility vehicle according to claim 1, wherein the engaging portion of the screen shield is a bar, and the engaged portion of the front panel is a hook that the bar can engage.

5. The pick-up style utility vehicle according to claim 1, wherein the engaging portion of the screen shield is a hook.

6. The pick-up style utility vehicle according to claim 1, wherein the screen shield comprises a net material.

7. The pick-up style utility vehicle according to claim 1, wherein the screen shield comprises a sheet material having a transparent portion.

* * * * *